July 17, 1956     J. G. JACKSON     2,755,430
APPARATUS FOR AND METHOD OF LOGGING EARTH BORES
Filed May 24, 1954
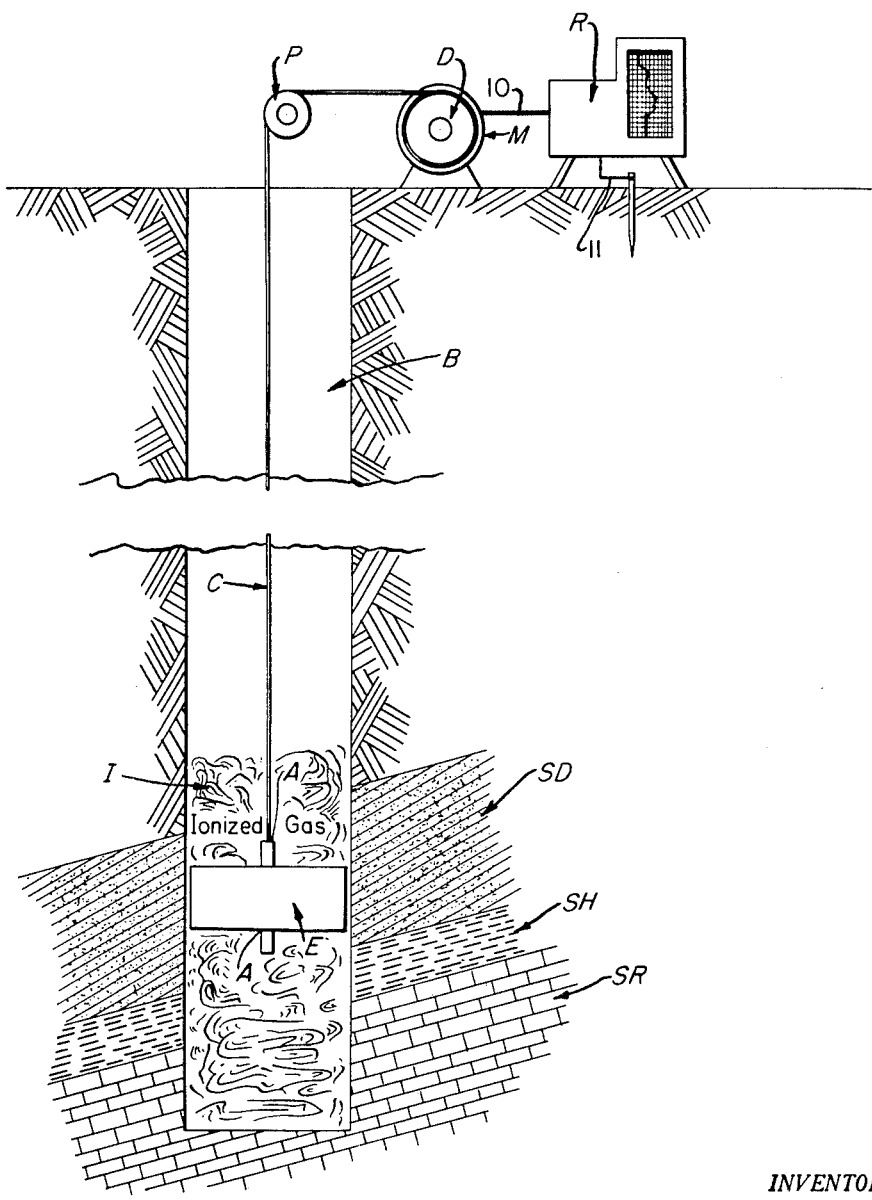
*INVENTOR.*
JOHN GORDON JACKSON
BY
*P. H. Lamphere*
ATTORNEY though at the top as vertical section through an earth bore illustrating sche-

United States Patent Office 2,755,430
Patented July 17, 1956

2,755,430
APPARATUS FOR AND METHOD OF LOGGING EARTH BORES

John Gordon Jackson, Denver, Colo., assignor to Eastman Oil Well Survey Company, Denver City, Colo., a corporation of Delaware Application May 24, 1954, Serial No. 431,854

9 Claims. (Cl. 324—1)

This invention relates to logging of earth bores in an electrical manner to thereby obtain information as to the kind and character of earth formations through which the bore is drilled.

With presently used electrical logging methods the data to be obtained comes from the resistivity of the permeable and porous formations of the earth's strata. This resisitivity is measured by the employment of an electrode lowered into the bore whereby it is possible to transmit current into and through the formations. Once the current is in the formations it can travel back to the surface and be measured by a recording system. Transmission of current from the electrode to the formation is generally accomplished through some liquid in the bore if it is a sufficient conductor. After the current reaches the formation its flow to the surface is accomplished by means of the conductivity of the electrolyte contained in and around the grains of matter in the earth's formation. Conductivity or the reverse, i. e., resistivity will vary depending upon many factors among which is the texture of the formation, its fluid (electrolyte) content, type of mud, pressure, etc. By measuring the resistivity of the formations through which the bore passes, which can vary widely, it becomes possible to log the bore, that is, ascertain the type of formation involved and its fluid content.

During logging there is generally present in the bore drilling mud and this is usually the conductor employed to transmit current from the electrode to the formation. If oil, which is a non-conductor, is in bore then transmission of current to the formations is difficult and therefore special apparatus is necessary. One means is to have the electrode make direct contact with the formation. Another means is to cause radiations from the radio active material to penetrate the formations and log the bore by measuring the extent of effect on the formation of the radiations which varies with different formations. When no fluid is in the bore these same apparatuses and means can be used to analyze the formations but neither has been found to be entirely satisfactory as the apparatus is expensive.

One of the objects of my invention is to produce a new means and method of electrically logging an earth bore which has no fluid therein permitting the transmission of current from an electrode to the earth's formation.

Another object is to provide means for conducting an electrical current from an electrode to an earth formation in a dry bore so that efficient logging thereof can be accomplished by apparatus presently employed when a conducting liquid is in the bore.

A more specific object is to employ in electrical logging of earth bores containing non-conducting fluids an ionized gas as a medium of transmitting current from an electrode to the earth's formations so that recording of the resistivity of said formations can be accomplished in an efficient manner.

Yet another object is to provide means for establishing in an earth bore during electrical logging a body of ionized gas in surrounding relation to the electrode.

Other objects of my invention will become apparent from the following description taken in connection with the accompanying drawing in which the single figure is a vertical section through an earth bore illustrating schematically my improved method of electrically logging a dry bore and the apparatus involved.

Referring to the drawing in detail B indicates the earth bore which has been drilled or is being drilled into the earth's formations. The bore will pass through formations indicated as strata, which were laid down in the very distant past during the forming of the earth and existing either in their original position or having been disturbed by upheavals occurring at some later times. The formations differ and can be of any known substances found in the earth such as minerals, sand, shale, etc. Three strata are indicated, one being sand SD, another shale SH and third a type of sediment rock SR. Suspended in the well on a cable C is a single electrode E with this cable being an electrical conductor whereby current can be supplied to the electrode. The cable at the surface of the earth can extend over a pulley P and be wound on a drum D for lowering and raising with this drum controlled by a motor M. The cable C can be electrically connected to a recorder R by means of a conductor 10 with the recorder also being connected to the earth by wire 11 as is well known practice. The apparatus illustrated is one in common use for the logging of earth bores by the electrical method and in which drilling muds or other conducting liquids are in the bore between the electrode and the formations of the earth so that current can reach and flow through the earth and the conductivity or inversely the resistivity of the formations measured on the recorder.

When the bore is dry, that is, containing no liquid conductor, it will not be possible to transmit the current from the electrode to the formations which contain the electrolyte whereby current can complete the circuit from the earth's formation to the recorder. To overcome this deficiency for dry bores so that they will remain dry yet be capable of being logged by presently used apparatus just described I have conceived my invention. I supply a conductor between the electrode and the formations of the earth by providing in the bore an electrical conducting gas which will be a gas which has been ionized, that is, one in which the atoms thereof are electrically charged and disassociated into ions. The ionized gas will be in the bore so as to be between the electrode and the formation opposite the electrode. The whole bore, if it is going to be logged throughout its length, can be filled with a gas which can be ionized when in surrounding relation to the electrode as logging takes place so that there will be an electrical conductor medium from the electrode to the formation. After the gas is placed in the bore then one method that can be employed to cause the gas to be ionized is to place adjacent to or on the electrode a substance or device which can emit radiant energy capable of ionizing the gas. In the drawing the source of radiant energy is shown at A. Ultraviolet rays and gamma rays could be emitted from the source to cause the ionization. Other ways of ionization could be used as by causing alpha and beta particles to impact the atoms of the gas with the particles being coated on the source member. The particles can be either artificial or natural. Whatever gas is used, it should preferably be of a density which will displace any air or other gas which is in the bore. One such heavy gas which can be used is carbon dioxide. With such a heavy gas, if it should be desired to log only the lower portion of the bore, then only enough carbon dioxide would be placed in the bore so that this lower portion of the bore which is to be logged would be filled with carbon dioxide either ionized before placing in the bore or ionized as the electrode is being moved in the bore. In some instances where the gas is not heavier than air it may be necessary to place the gas under pressure so as to force the ionized gas into the formations to some extent so that a good contact with the conducting electrolyte of the formation particles can take place. Besides carbon dioxide gas such gases as argon, neon, nitrogen, etc. can be used but because of low cost, density and availability carbon dioxide is satisfactory. The electrode will be of a size to be close to the formations so that the gap in which the ionized gas will be used as a conductor will be small.

With my improved method of logging dry holes it will be seen that there need be no change in apparatus presently being used except for the means involved for ionizing the gas after it was placed in the bore. In such case the only modification would be to attach on the electrode or near the electrode the device or substance to accomplish the desired ionization of the gas. Also with my improved method of logging dry earth bores the logging can be accomplished as fast as is done with conducting liquid, such as drilling mud in the bore. Furthermore, my method does not require the expensive apparatuses such as those presently used in logging earth bores which are dry or which have a non conducting liquid therein such as oil.

My new method of logging and the means for carrying it out are particularly well adapted for shallow bores which are drilled primarily for exploration purposes, such as is done in coring for some minerals like potash, uranium, etc. It, however, is not limited to these types of bores as it is also readily usable in any dry earth bore regardless of its depth or size and particularly earth bores which may be drilled by use of gas under pressure or air under pressure as the circulating fluid and some substance used to maintain the bore in a dry or relatively dry condition, at least such a condition that insufficient liquid is present in the bore to establish a current conducting medium.

What is claimed is:

1. A method of logging an earth bore which does not contain any electrical conductive fluid, said method comprising suspending in said bore an electrode in close proximity to the wall of said bore, connecting said electrode in an electrical circuit including the earth's formations from the earth's surfaces to the bore adjacent the electrode, establishing an ionized gas between the electrode and the earth's formations adjacent thereto, and measuring the voltage drop between the electrode and the earth's surface through the formations for different depth positions of the electrode in the bore.

2. The method of claim 1 in which the established ionized gas has a greater specific gravity than any gas normally in the bore.

3. The method of claim 1 in which the ionized gas is placed in the bore to be between the electrode and the earth's formations in a natural condition, and ionization is established by an ionizing action from a source of radiant energy suspended with the electrode.

4. The method of claim 1 in which the ionized gas is caused to be ionized after being placed in the bore in its natural condition and ionization is established by impact of the atoms of the gas by ionizing particles from a source suspended with the electrode.

5. Apparatus for logging an earth bore having electrical non-conducting fluid therein, said apparatus comprising an electrode, means for suspending the electrode in the well and moving it up and down therein, means for establishing a body of ionized gas between the electrode and the earth's formations adjacent thereto, an electrical circuit including said ionized gas connecting the electrode to the earth's surface so that current can pass through the earth's formations from the electrode, and means for measuring the voltage drop in the circuit as the electrode is moved.

6. The apparatus of claim 5 in which an ionizable gas in its natural condition is placed in the earth bore so as to be between the electrode and the wall of the bore, and there is provided means suspended with the electrode for ionizing the gas surrounding the electrode.

7. In a method of electrical logging of earth bores wherein an electrode having electrical current applied thereto is moved longitudinally within the bore and an electrical circuit is to be established between the electrode and the surface through the earth formations therebetween, the improvement which resides in disposing an ionized gas within the bore in the area between the electrode and the wall of the bore, whereby said gas forms an electrical current flow path between said electrode and the earth formation, and recording variations in the electrical circuit as affected by the electrical properties of the earth formations through which the current flows.

8. In a method of electrical logging of earth bores wherein an electrode having electrical current applied thereto is moved longitudinally within the bore and an electrical circuit is to be established between the electrode and the surface through the earth formations therebetween, the improvement which resides in disposing a gas within the bore in the area between the electrode and the wall of the bore, and ionizing said gas simultaneously with the flow of electrical current through the electrode, whereby the ionized gas forms an electrical current flow path between the electrode and the earth formation adjacent the bore, and recording variations in the electrical circuit as affected by the electrical properties of the earth formations through which the current flows.

9. A method of logging an earth bore wherein the bore is dry or contains an electrical nonconducting fluid, said method including, moving longitudinally within the bore an electrode having current applied thereto, disposing an ionized gas within the bore in the area between the electrode and the wall of the bore, whereby said gas forms an electrical current flow path between the electrode and the earth formation adjacent the bore, establishing an electrical circuit through the electrode and earth formations to the surface, and recording variations in said electrical circuit as affected by the electrical properties of the earth formations through which the current flows.

References Cited in the file of this patent

UNITED STATES PATENTS

| | | |
|---|---|---|
| 2,231,577 | Hare | Feb. 11, 1941 |
| 2,505,534 | Fiske | Apr. 25, 1950 |
| 2,659,046 | Arps | Nov. 10, 1953 |
| 2,693,583 | Rigrod | Nov. 2, 1954 |